United States Patent [19]

Aubee

[11] Patent Number: 5,355,854
[45] Date of Patent: Oct. 18, 1994

[54] SUPPLEMENTAL GASEOUS FUEL SYSTEM FOR A DIESEL ENGINE

[76] Inventor: Thomas A. Aubee, 27 Beacon Dr., North Kingstown, R.I. 02852

[21] Appl. No.: 30,706

[22] Filed: Mar. 12, 1993

[51] Int. Cl.⁵ ............................................. F02B 7/00
[52] U.S. Cl. .............................. 123/431; 123/27 GE; 123/526; 123/527
[58] Field of Search ................. 123/27 GE, 526, 527, 123/431

[56] References Cited

U.S. PATENT DOCUMENTS

| | | | |
|---|---|---|---|
| 3,540,419 | 11/1970 | Fox | 123/27 |
| 3,753,424 | 8/1973 | Haidvogel | 123/276 |
| 4,463,734 | 8/1984 | Akeroyd | 123/525 |
| 4,517,928 | 5/1985 | Wolters | 123/27 GE |
| 4,597,364 | 7/1986 | Young | 123/526 |
| 4,603,674 | 6/1986 | Tanaka | 123/575 |
| 4,817,568 | 4/1989 | Bedford | 123/431 |
| 5,140,959 | 8/1992 | Durbin | 123/27 GE |
| 5,224,457 | 7/1993 | Arsenault et al. | 123/526 |

Primary Examiner—E. Rollins Cross
Assistant Examiner—Weilun Lo
Attorney, Agent, or Firm—Salter & Michaelson

[57] ABSTRACT

A supplemental gaseous fuel system is provided for retrofit to an existing diesel engine having a conventional load sensitive speed control. The supplemental gaseous fuel system operates independently of the load sensitive speed control thus enabling the diesel fuel supply system to rapidly react to load transients. A control system senses a physical position of an actuator mechanism in the diesel fuel injector pump and opens and closes a buffer valve in response to predetermined positions of the actuator. In normal operation of the engine, variations (increases) in engine load are initially corrected for by an immediate but momentary increase in diesel fuel to the engine. However, as soon as the engine has responded to the increase in diesel fuel and increased its rate of combustion, the gas flow to the engine is increased and causes the diesel fuel actuator to approach a minimum fuel setting.

10 Claims, 3 Drawing Sheets

SUPPLEMENTAL GASEOUS FUEL SYSTEM FOR A DIESEL ENGINE

BACKGROUND OF THE INVENTION

The instant invention relates to a fuel system for an internal combustion engine, and more particularly to a supplemental gaseous fuel system for a diesel engine.

Diesel engines, and more particularly stationary diesel engines, i.e., those powering generators, pumps, and compressor power units have heretofore been known in the art. A stationary diesel engine normally includes a load sensitive speed control system which automatically controls a diesel fuel supply to provide a precise volume of diesel fuel to the engine to yield a given power output. The speed control is therefore operative for automatically increasing or decreasing the volume of fuel flow in response to fluctuations in engine load. For example, a diesel electric generator is required to operate at a constant speed regardless of changes in load (known as transients) in order to produce electric power at a constant, predetermined frequency, i.e., 60 hertz. In this regard, the speed control automatically increases or decreases the fuel flow in order to maintain the engine at a constant speed.

For reasons which may include fuel cost, availability of fuel, and engine exhaust emissions control, it has been known in the art to substitute a gaseous fuel, i.e., natural gas, propane gas, etc., for a predetermined percentage of diesel fuel consumed by the engine at a given power output. The use of diesel fuel in these diesel/gaseous fuel systems is typically limited at a minimum, to a volume which is sufficient to ignite the gaseous fuel, and to provide cooling and lubrication for various combustion chamber components.

A variety of dual fuel systems for diesel engines have heretofore been known in the art. For example, the Fox U.S. Pat. No. 3,540,419; Haidvogel U.S. Pat. No. 4,753,424; Akeroyd U.S. Pat. No. 4,463,734; Wolters U.S. Pat. No. 4,517,928 and Tanaka U.S. Pat. No. 4,603,674 are representative of such dual fuel systems. The heretofore known dual fuel systems typically include automatic load sensitive fuel controls which simultaneously modulate a supply of diesel fuel and a high pressure supply of gaseous fuel to provide, in combination, the varying total energy input requirements of a diesel engine. These combination fuel control systems customarily operate using what may be termed "predictive logic" wherein highly sophisticated electronics are utilized to monitor the engine's dynamic load, and to adjust (increase/decrease) the fuel input to the engine. More specifically, the dual fuel control calculates the theoretical energy requirements of the engine at a given load, and while restricting diesel fuel supply to minimum, delivers gaseous fuel through the engine intake manifold to a degree which is sufficient to maintain the engine output at a predetermined speed. Although these systems are fairly accurate at predicting the theoretical energy requirements of the engine, experience has proven that an engine equipped in this manner is relatively slow to react to the introduction of gaseous fuel. A delay in response time can cause incorrect fuel mixtures and combustion irregularities, such as improper fuel detonation, excessive combustion cylinder temperatures, excessive exhaust emissions, and rapid engine wear. Other potential drawbacks typically encountered with these systems include the need for an elevated gas supply pressure, a relatively high number of system components which may be subject to wear and failure, and costly installation and maintenance fees.

As a result of the hereinabove described problems, the applications of these types of fuel control systems are usually limited to situations where rapid transient response is not critical. It is pointed out that reaction time in an electric power generator is critical because fluctuations in engine speed cause fluctuations in the frequency of the electric power, which can ultimately cause damage to electrical devices being powered by the generator. Therefore, fuel systems for diesel electric generators are usually limited to diesel fuel only because of the slow reaction time of gaseous fuel.

SUMMARY OF THE INVENTION

The instant invention provides a supplemental gaseous fuel system for a stationary diesel engine which readily allows for the safe, efficient, and cost effective substitution of gaseous fuel for diesel fuel without limiting the ability of the diesel fuel supply system to rapidly react to load transients.

The stationary diesel engine includes a diesel fuel injector pump and a load sensitive speed control. The fuel injector pump includes an electrically controlled actuator for regulating a volume of diesel fuel supplied to the engine, and the speed control is operative for controlling the actuator in response to variations in engine load. The supplemental gaseous fuel supply system of the instant invention comprises a gaseous fuel inductor or mixer for introducing a flow of gaseous fuel to an intake manifold of the engine, a gas flow throttle valve for determining a maximum flow of gaseous fuel at a given gas supply manifold pressure, a buffer valve for selectively controlling the flow of gaseous fuel to the engine, and a gaseous fuel supply manifold for providing a flow of gaseous fuel. The buffer valve comprises an electrically actuated ball valve which is actuable between a normally closed position, and an open position. The gaseous fuel supply manifold includes an automatic block and vent valve assembly which is actuable between a normally closed position and an open position, and a demand type gas regulator which allows the gaseous fuel to be drawn into the engine's charge air at a flow rate proportional to the combustion rate. The instant fuel system further comprises a voltage sensing relay which is operative for sensing a voltage supplied to the actuator in the diesel fuel injector pump. In this regard, the voltage sensing relay is operative for sensing a physical position of the fuel actuator. The voltage sensing relay continuously monitors the voltage supplied to the actuator, and is operative for opening the block and vent assembly and the ball valve in response to a predetermined voltage supplied to the actuator. The block and vent valve assembly opens substantially instantly to provide a flow of gaseous fuel to the demand regulator, and the buffer valve cycles open over a predetermined period to gradually allow the flow of gaseous fuel to be drawn into the intake manifold of the engine from the demand regulator. The voltage sensing relay further includes a hysteresis control, and in this connection, when the actuator voltage drops to a value below the first predetermined voltage, the voltage sensing relay is operative for closing the buffer valve and the block and vent valve assembly, wherein the buffer valve cycles closed to gradually reduce the flow of gaseous fuel to the intake manifold, and the block and vent valve assembly closes after the buffer valve has cycled closed.

When the gaseous fuel system is engaged, increases in engine load are immediately responded to by the diesel speed control using diesel fuel. However, as soon as the engine has responded, the engine draws in a greater amount of gaseous fuel in proportion to the increased combustion rate. The speed control senses the increase in gaseous fuel and automatically decreases the diesel fuel supplied to the engine to maintain the engine at the required speed.

It can therefore be seen that the supplemental gaseous fuel supply system of the instant invention operates independently of the load sensitive diesel fuel control, and thus allows the fuel control to quickly respond to variations in engine speed with a volume of diesel fuel.

Accordingly, it is an object of the instant invention to provide a supplemental gaseous fuel supply system which readily allows for the safe, efficient, and cost effective substitution of gaseous fuel for diesel fuel in a diesel engine having a load sensitive speed control.

It is another object to provide a supplemental gaseous fuel system which operates independently of a load sensitive speed control.

It is yet another object to provide a gaseous/diesel dual fuel system which rapidly reacts to load transients.

It is still another object to provide a supplemental gaseous fuel system which utilizes a relatively low pressure gas supply.

It is still yet another object to provide a supplemental gaseous fuel system which has few moving parts.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
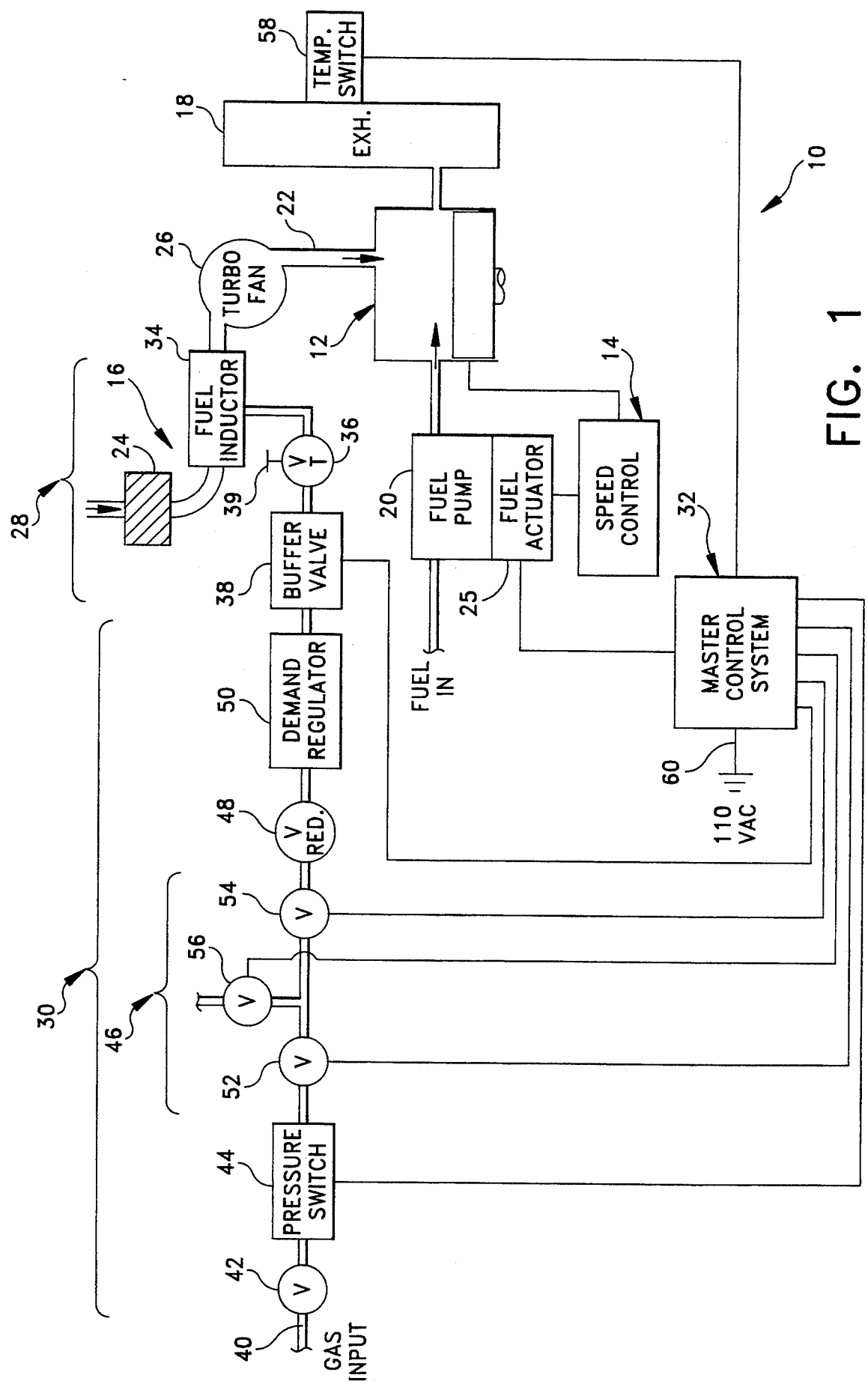
FIG. 1 is a schematic view of the supplemental gaseous fuel system of the instant invention.

Referring now to the drawings, the supplemental gaseous fuel system of the instant invention is illustrated, and generally indicated at 10 in FIG. 1. As will hereinafter be more fully described, the instant invention 10 is operative for substituting a gaseous fuel for diesel fuel in a diesel engine generally indicated at 12 having a load sensitive speed control generally indicated at 14. The supplemental gaseous-fuel system 10 operates independently of the load sensitive speed control 14, and thus allows the load sensitive speed control 14 to quickly respond to load transients using diesel fuel. In the instant embodiment, the diesel engine 12 comprises a stationary diesel engine for use in generating electricity. The diesel engine 12 comprises an air intake conduit generally indicated at 16, an exhaust conduit 18, and a diesel fuel injector pump 20. The air intake conduit 16 comprises an intake manifold 22, and a low restriction air filter 24. The fuel injector pump 20 includes a fuel actuator 25 which is operative for regulating a volume of diesel fuel supplied to the engine 12. In the instant embodiment, the fuel actuator 25 is electrically controlled, and in this regard, the fuel injector pump 20 is operated by supplying a predetermined voltage to the actuator 25 to cause it to be moved a predetermined distance, thereby supplying a predetermined volume of diesel fuel to the engine 12. The fuel actuator 25 of the instant embodiment has a voltage range of 0.0 volts (no fuel) to 7.0 volts (maximum fuel). The load sensitive speed control 14 is operative for sensing a dynamic load on the engine 12 and for automatically controlling the operation of the fuel pump 20, and more specifically the actuator 25 to provide a precise volume of fuel required by the engine 12 to yield a given power output. The load sensitive speed control 14 is conventional in the art, and therefore it is only generally indicated in the drawings. The engine 12 also preferably includes a turbo fan 26 which is operative for rapidly increasing air flow through the intake manifold 22 during periods of high output operation.

The supplemental gaseous fuel system comprises a gaseous fuel introduction assembly generally indicated at 28, a gaseous fuel supply manifold generally indicated at 30, and a master control system generally indicated at 32. The fuel introduction system 28 comprises a gaseous fuel inductor or mixer 34, a gas flow throttle valve 36, and a buffer valve 38. The gaseous fuel inductor or mixer 34 is conventional in the art, and it is installed in a conventional manner in the engine's inlet air conduit 16 between the air filter 24 and the turbo fan 26. The gaseous fuel inductor 34 enables the engine's intake suction to simultaneously draw in air through the air filter 24 and gaseous fuel in from the gaseous fuel supply manifold 30.

The gas flow throttle valve 36 is connected to the gaseous fuel inductor 34, and it preferably comprises an adjustable throttle valve having a manually operable adjustment handle 39. The gas flow throttle valve 36 is operative for determining a maximum flow rate of gaseous fuel to the engine 12 at a given manifold pressure.

The buffer valve 38 is connected to the gas flow throttle valve 36, and it preferably comprises an electrically actuated ball valve. The buffer valve 38 is operative for selectively controlling a flow of gaseous fuel to the engine 12, and it is actuable between a normally closed position and an open position. In this regard, the electrically actuated buffer valve 38 slowly cycles open over an eight second period to allow for a slow introduction of gaseous fuel to the engine 12, and further cycles closed over an eight second period to allow for a slow reduction of gaseous fuel to the engine 12.

The gaseous fuel supply manifold 30 comprises a pressurized source of gaseous fuel 40, a manual shut-off valve 42, a gas pressure switch 44, a block and vent valve assembly generally indicated at 46, a pressure reducing valve 48, and a demand type gas regulator 50. The pressurized source of gaseous fuel 40 preferably comprises a conventional natural gas supply line, although other pressurized and non-pressurized gaseous fuel sources, such as propane, are also contemplated within the scope of the invention. The shut-off valve 42 is conventional in the art, and it is actuable between a closed position and an open position. The gas pressure switch 44 preferably comprises a membrane-type switch having snap-action contacts which close upon the gas pressure attaining a predetermine pressure. The gas pressure switch 44 is located adjacent to the shut-off valve 42, and is operative for sensing the pressure of the gaseous fuel flow exiting the shut-off valve 42. The gas pressure switch 44 provides an output signal which is fed to the control system 32. The block and vent valve assembly 46 is conventional in gaseous fuel supply systems, and it comprises first and second block valves 52 and 54 respectively, and a vent valve 56 positioned between the block valves 52 and 54. The block and vent valve assembly 46 is actuable between a normally closed position and an open position. In the closed position, the two block valves 52 and 54 are closed and the vent valve 56 is open. In the open position, the two block valves 52 and 54 are open, and the vent valve 56 is closed.

The pressure reducing valve 48 is conventional in the art, and it is operative for reducing the flow pressure of gaseous fuel exiting the block and vent valve assembly 46 so that it is at a substantially ambient pressure as it enters the demand regulator 50. It is pointed out that the instant system 10 operates on a relatively low pressure fuel flow as compared to several of the prior art systems which require a high pressure fuel flow. It is also pointed out that if a low pressure gaseous fuel source 40 is provided, the pressure reducing valve 48 may be eliminated from the gas supply manifold 30.

The demand gas regulator 50 is connected between the pressure reducing valve 48 and the ball valve 38, and it is operative for restricting the passage of gaseous fuel to the fuel introduction assembly 28, unless subjected to a negative inlet pressure, or suction, from the engine intake air conduit 16.

The instant fuel system 10 further comprises a temperature switch 58 which is located in the exhaust conduit 18 of the engine. The temperature switch 58 preferably comprises a pyrometer-type temperature switch, and it is operable for sensing the exhaust temperature of the engine 12 wherein it provides an output signal which is fed to the control system 32.

Figure 2:
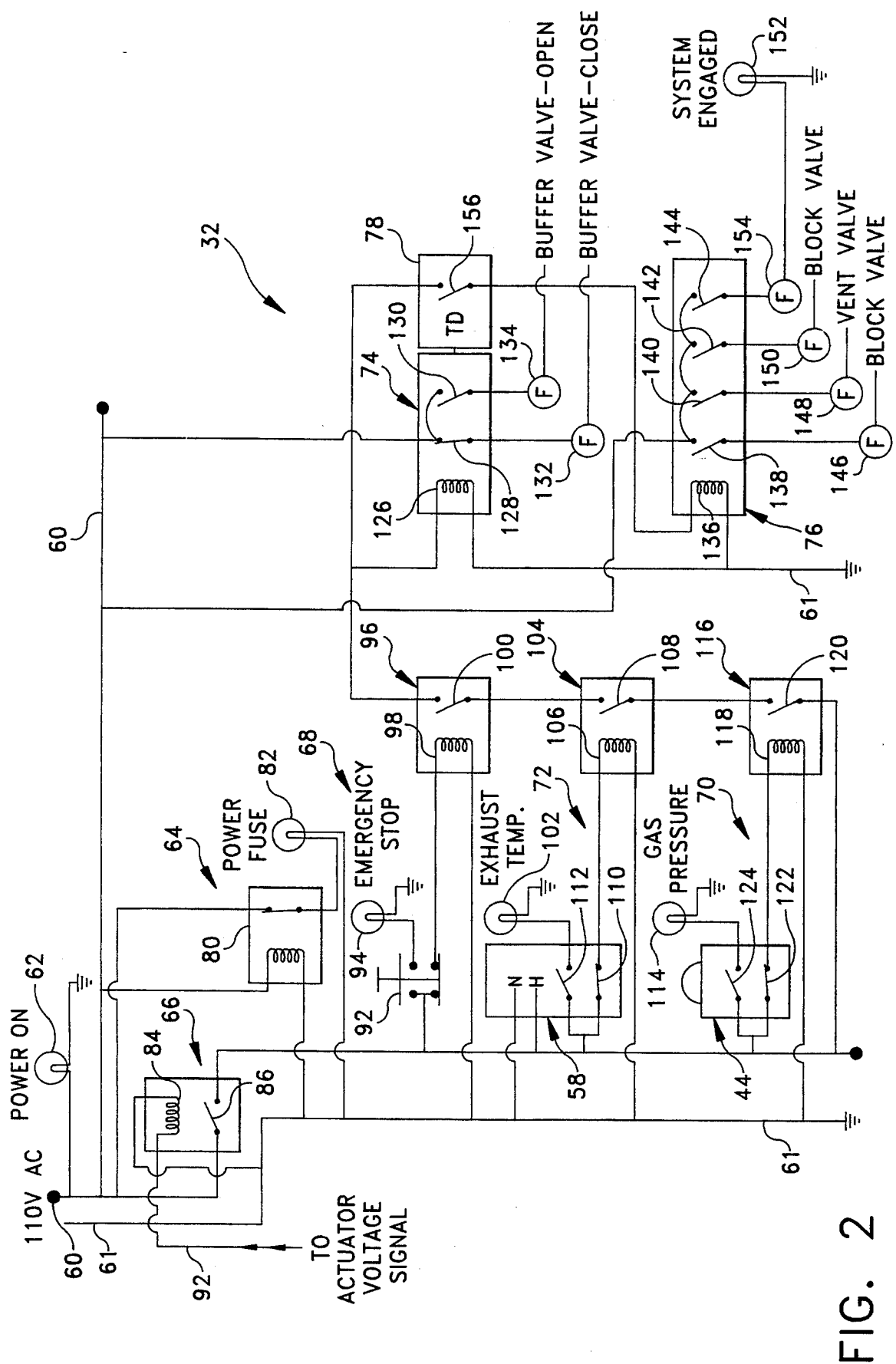
FIG. 2 is a detailed schematic view of the control system thereof.

Referring now to FIG. 2, the control system 32 comprises a conventional 110 volt AC power supply 60, a ground 61, a power indicator lamp 62, a power fuse circuit generally indicated at 64, a voltage sensing relay generally indicated at 66, an emergency stop safety circuit generally indicated at 68, a gas pressure safety circuit generally indicated at 70, a temperature safety circuit generally indicated at 72, a first control relay generally indicated at 74 for controlling operation of the buffer valve 38, a second control relay generally indicated at 76 for controlling operation of the block and vent valve assembly, and a delay on break switch 78.

Although a 110 v power supply is indicated in the preferred embodiment, the control system can be readily adapted to operate with all other conventional power supplies.

The power fuse circuit 64 comprises a relay 80, and an indicator lamp 82. Electrical power is supplied to the fuse circuit 64 as illustrated in FIG. 2.

Figure 3:
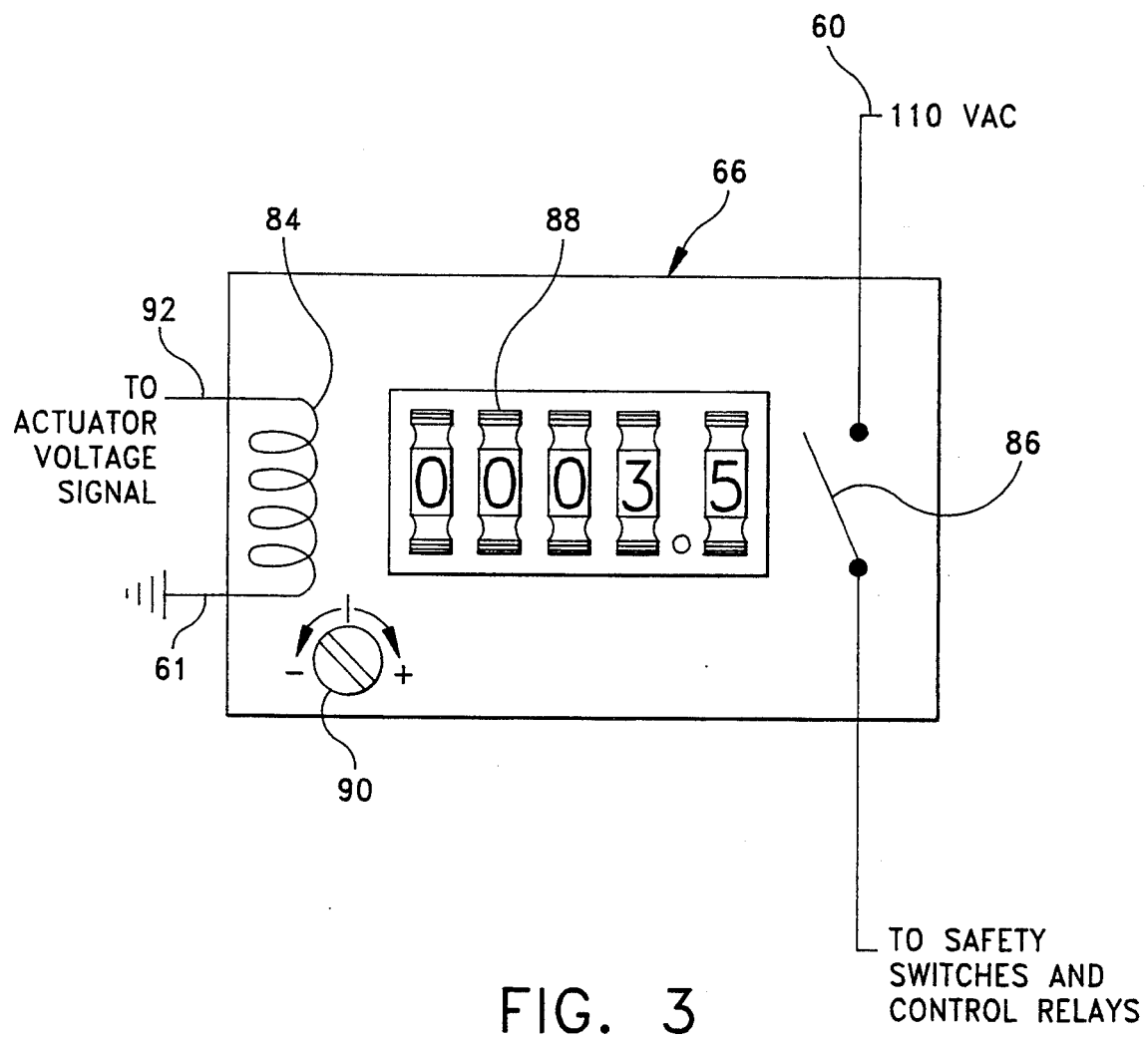
FIG. 3 is a schematic view of the voltage sensing relay of the control system.

Referring now to FIGS. 2 and 3, the voltage sensing relay 66 is connected to the diesel fuel injector pump 20, more specifically the fuel actuator 25, and it is operative for sensing the voltage signal supplied to the actuator 25. In this regard, the voltage sensing relay 64 is operative for sensing a physical position of the actuator 25. The voltage sensing relay 64 continuously monitors the voltage supplied to the actuator 25, and controls the opening and closing of the block and vent valve assembly 46 and the ball valve 38 in response to predetermined positions (voltages) of the actuator 25. The voltage sensing relay 64 is conventional in the electrical arts, and it comprises a relay coil 84, a relay switch 86, a plurality of thumbwheel controls 88, and a hysteresis or deadband control 90. The actuator voltage signal 92 from the fuel actuator 25 is applied across the relay coil 84, and the 110 v power supply 60 is connected in series with the relay switch 86. In this regard, the relay switch 86 is normally in an open position so that the control system 32 is normally de-energized. The thumbwheel controls 88 are operative for setting a threshold voltage above which the relay switch 86 will close to energize the control system 32. In the instant embodiment, the threshold voltage is set to 3.5 v as illustrated in FIG. 3. Determination of a suitable threshold voltage will be explained hereinafter in reference to calibration of the fuel system 10. During operation of the engine 12 in an idle condition, i.e. 1200 RPM with no load applied to the engine 12, the actuator 25 will typically have a voltage signal 92 of 2.0 v. As the power load on the engine 12 is increased, the actuator voltage signal 92 is increased to cause the actuator 25 to move and provide a greater volume of diesel fuel. When the actuator voltage signal 92 is increased to greater than 3.5 v, the relay switch 86 closes to energize the control system 32, i.e. provide power to the safety circuits, 68, 70, and 72, and to the first and second control relays 74 and 76. The hysteresis or deadband control 90 is adjustable from 0% to 50% of the threshold voltage, and in the instant embodiment, the hysteresis control 90 is set so that it acts in a declining voltage mode. More specifically, the hysteresis 90 is set so that the relay switch 86 will open to de-energize the control system 32 when the actuator voltage signal 92 declines to approximately 2.8 v.

The emergency stop circuit 68 comprises a push-button switch 92, an indicator lamp 94 and a relay generally indicated at 96. The relay 96 includes a relay coil 98 and a normally open switch 100. The push-button switch 92 is connected to the power supply 60, the relay coil 98, and the indicator lamp 94, and it is actuable between a first position (as shown in FIG. 2) wherein the relay coil 98 is connected in series with the power supply 60, and a second position wherein the indicator lamp 94 is connected in series with the power supply 60. When the switch 92 is in the first position, a voltage is applied across the relay coil 98 causing the relay switch 100 to close. When the switch 92 is in the second position, a voltage is applied across the switch 92 to illuminate the lamp 94.

The temperature safety circuit 72 comprises the temperature switch 58, an indicator lamp 102, and a relay generally indicated at 104. The relay 104 includes a relay coil 106 and a normally open switch 108. The temperature switch 58 includes a first normally closed switch 110 which is connected to the power supply 60 and the relay coil 106, and a second normally open switch 112 which is connected to the power supply 60 and the indicator lamp 102. If the temperature is within an acceptable range, the first switch 110 remains closed to apply a voltage across the relay coil 106 thereby closing the relay switch 108, and the second switch 112 remains open. If the temperature rises above the acceptable range, the first switch 110 opens to prevent voltage flow across the relay coil 106 thereby opening the relay switch 108, and the second switch 112 closes to illuminate the indicator lamp 102.

The gas pressure safety circuit 70 comprises the gas pressure switch 44 an indicator lamp 114, and a relay generally indicated at 116. The relay 116 has a relay coil 118 and a normally open relay switch 120. The pressure switch 44 includes a first normally closed switch 122 which is connected to the power supply 60 and the relay coil 118, and a second normally open switch 124 which is connected to the power supply 60 and the indicator lamp 114. If the pressure is within an acceptable range, the first switch 122 remains closed to apply a voltage across the relay coil 118 thereby closing the relay switch 120, and the second switch 124 remains open. If the pressure rises or falls below an acceptable level, the first switch 122 opens to prevent voltage flow across the relay coil 118 thereby opening the relay switch 120, and the second switch 124 closes to illuminate the indicator lamp 114. The relay switches 100, 108, and 120 in the safety circuits 68, 70, and 72 are all connected in series with the power supply 60.

The first control relay 74 comprises a relay coil 126, a first normally closed switch 128 and a second normally open switch 130. The relay coil 126 is connected in series with the relay switches 100, 108, and 120 of the safety circuit. The first switch 128 is connected in series with the power supply 60, a fuse 132 and the buffer valve 38. A voltage applied through the first switch 128 actuates the buffer valve 38 to the closed position. The second switch 130 is also connected in series with the power supply 60, a fuse 134, and the buffer valve 38. A voltage applied through the second switch 130 actuates the buffer valve 38 to the open position. It can therefore be appreciated that the buffer valve 38 is normally maintained in a closed position. When a voltage is applied across the relay coil 126, the first switch 128 opens, and the second switch 130 closes thereby causing the buffer valve 38 to be actuated to the open position.

The second control relay 76 comprises a relay coil 136, and four normally open switches 138, 140, 142, and 144. The relay coil 136 is connected in series with the relay switches 100, 108 and 120 through the time delay module 78. All four switches 138, 140, 142, and 144 are connected to the power supply 60. The first switch 138 is connected to the first block valve 52 through a fuse 146, the second switch 140 is connected to the vent valve 56 through a fuse 148, the third switch 142 is connected to the second block valve 54 through a fuse 150, and the fourth switch 144 is connected to an indicator lamp 152 through a fuse 154. When there is no voltage applied across the relay coil 136, all the switches 138, 140, 142, and 144 remain open, and the block vent valve assembly 46 is maintained in a closed position, i.e. block valves 52 and 54 closed, and vent valve 56 open, and the indicator lamp 152 is not illuminated. When the control system 32 is energized, and a voltage is applied across the relay coil 136, the switches 138, 140, 142, and 144 close to open the block and vent valve assembly, i.e. open the block valves 52 and 54 and close the vent valve 56,0and to illuminate the indicator lamp 152.

The time delay module 78 is connected in series with the relay switches 100, 108, and 120 and the relay coil 136 of the second control relay 76. The time delay module 78 comprises a delay-on-break switch 156 which allows a voltage to immediately pass through the switch 156 when applied thereto. However, when the voltage stream through the switch 156 is broken, the module 78 maintains a voltage through the switch 156 for a predetermined period of time. In the instant embodiment, the time delay module 78 provides a ten second delay.

Before the gaseous fuel system 10 may be engaged for normal operation, it must first be calibrated for a maximum gas flow rate at a given manifold pressure. This is accomplished in the following manner. With the gaseous fuel system 10 shut-off (manual shut-off valve 42 closed) and the gaseous throttle valve 36 closed, the engine 12 is brought to operate at an idle condition, i.e., 1200 RPM with no load applied. In this operating mode, the diesel fuel actuator voltage is noted (2.0 v). The engine 12 is then brought to its maximum output level, i.e. 1200 RPM's with maximum load, and the actuator voltage is again noted (6.0 v). The gaseous fuel system 10 is then engaged by opening the manual shut-off valve 42. Gaseous fuel then flows through the gas supply manifold 30 to the demand regulator 50 where it is available for introduction into the engine air intake 16. While observing the actuator voltage signal 92, exhaust temperature and engine 12 for indications of detonation, the throttle valve 36 is slowly opened (i.e. by turning the manual valve handle 39), wherein the gaseous fuel is slowly drawn into the engine 12 by the suction of the turbo 26. In this connection, the BTU content of the gaseous fuel supplements the diesel fuel and causes the engine combustion rate to increase. The speed control 14 reacts by decreasing the actuator voltage, and hence the flow of diesel fuel to the engine. The throttle valve 36 is slowly opened until the actuator voltage approaches a desired setting. In the instant embodiment, the desired voltage reading is selected to be 3.5 v. This value is based upon a desired diesel/gaseous fuel ratio, i.e. 60% gaseous fuel and 40% diesel fuel at a maximum combustion rate. The desired voltage can alternatively be based upon a number of other factors including desired exhaust emissions. It is pointed out that this calibration method establishes an optimum ratio of diesel fuel to gaseous fuel at a maximum combustion rate. (The intake airflow rate ultimately controls gas input to the engine 12 via suction exerted on the gaseous fuel inductor 34). At sub-maximum combustion rates the gaseous fuel inductor 34 and demand regulator 50 proportionally reduce the gaseous fuel flow with reduction in combustion airflow. The desired voltage reading is then set into the voltage sensing relay 66 by adjusting the thumbwheel controls 88 to read the appropriate setting. The hysteresis control 90 on the voltage sensing relay 66 is then adjusted in a declining voltage mode to approximately 20% of the threshold voltage (3.5 v).

The supplemental gaseous fuel system 10 is now ready for operation. During operation of the diesel engine 12 in an idle condition (1200 RPM's, no load, 2.0 v actuator voltage) the gaseous fuel system 10 is normally de-energized, i.e. voltage sensing relay switch 86 open with no voltage flowing through the safety switches 100, 108, and 120 or the control relay coils 126 and 136. However, when load on the engine 12 increases and the voltage sensing relay 66 senses an actuator voltage signal 92 of greater than 3.5 v, the relay switch 86 closes to energize the control system 32. More specifically, when the relay switch 86 closes, voltage flows through the switch 86 to energize the safety mechanisms 68, 70 and 72, and the control relays 74 and 76. If the safety circuits i.e. emergency stop switch 68, temperature switch 72 and pressure switch 70 indicate proper operating conditions, voltage is applied across the relay coils 98, 106, and 118 to close the relay switches 100, 108, and 120. Closing of the relay switches 100, 108, and 120 allows voltage to flow through the relay coils 126 and 136 of the first and second control relays 74 and 76. The switches 128 and 130 in the first control relay 74 then flip-flop to actuate the buffer valve 38 to the open position, and the switches 138, 140, 142 and 144 in the second control relay 76 flip-flop to open the block and vent valve assembly 46 and to illuminate the "system engaged" indicator lamp 152. The block and vent valve assembly 46 opens substantially instantly to provide a flow of gaseous fuel to the demand regulator 50, and the buffer valve 38 slowly cycles open over an eight second period to gradually allow the flow of gaseous fuel to be drawn into the intake manifold 16 from the demand regulator 50. The engine 12 then draws in gaseous fuel at a flow rate proportional to the combustion rate. The speed control 14 senses the increase in gaseous fuel and decreases the diesel fuel supplied to the engine 12. In this regard, the flow rate of gaseous fuel is determined by the throttle valve 36 so that only a given amount of gaseous fuel can be drawn into the engine 12 at a given intake pressure. This effectively maintains the actuator voltage signal 92 at a value of approximately 3.5 v during steady state loads. It is pointed out that the gaseous fuel system 10 operates independently of the diesel fuel system, i.e. fuel pump 20 and speed control 14. When the gaseous fuel system 10 is engaged, increases in engine load are immediately compensated for by the speed control 14 using diesel fuel. After the engine 12 has responded to the increase in diesel fuel and increased its rate of combustion, the engine 12 draws in a greater flow of gaseous fuel according to the increased combustion rate. The speed control 14 senses the additional gaseous fuel and decreases the percentage of diesel fuel thereby causing the actuator voltage to again approach the predetermined setting of 3.5 v.

The hysteresis setting 90 prevents the voltage sensing relay switch 86 from de-energizing the control system 32 when the actuator voltage signal 92 returns to 3.5 v. In this regard, the hysteresis or deadband control 90 permits the actuator voltage signal 92 to decrease to approximately 2.8 v before de-energizing the control system 32. When the actuator voltage drops below 2.8 v, the relay switch 86 opens to de-energize the control system 32. More specifically, when the relay switch 86 opens, the voltage flowing across the first control relay coil 126 is immediately removed and the switches 128 and 130 flip-flop back to their original positions wherein the buffer valve 38 is actuated back to its normal closed position. However, the delay on break switch 78 continues to apply voltage across the second control relay coil 136 to maintain the block and vent valve assembly 46 in an open position for an additional ten seconds while the buffer valve 38 is allowed to cycle closed. It can therefore be appreciated that the buffer valve 38 cycles closed over a period of eight seconds to gradually reduce the flow of gaseous fuel to the engine 12, and the block and vent valve assembly 46 closes approximately two seconds after the buffer valve 38 closes. This delay mechanism prevents the flow of gas from being abruptly terminated when the system shuts down.

Although the specific mechanisms described herein for determining the position of the diesel fuel actuator 25 are based upon an electrical actuator, the instant fuel system 10 can readily be adapted to operate with other types of diesel actuators. In this regard, other types of electrical actuators, mechanical actuators and hydraulic actuators, combinations thereof, and limit switch detectors and other types of well known electrical detectors and mechanical switches can be employed to energize the fuel system 10 in response to predetermined positions of the actuator 25 and for allowing a deadband region.

It is further contemplated that the adjustable throttle valve 36 can be replaced by a fixed diameter throttle valve once the desired gas flow rate has been determined. Further, if the desired gas flow rate is known prior to the installation of the instant gaseous fuel system 10, a fixed gas flow throttle valve can be installed.

It is seen therefore that the instant invention provides an efficient supplemental gaseous fuel system 10 for a stationary diesel engine 12. The supplemental fuel system 10 operates independently of the diesel fuel system (fuel pump 20 and speed control 14) thus enabling the load sensitive speed control 14 to quickly respond to variations in engine speed with a volume of diesel fuel. However, as soon as the engine 12 has responded to the increase in diesel fuel and increased its rate of combustion, the gas flow rate to the engine 12 is increased and causes the diesel fuel actuator voltage to approach a minimum fuel setting.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A supplemental gaseous fuel system for a diesel engine including an intake manifold, a fuel injector pump having an actuator for regulating a volume of diesel fuel supplied to said engine, and load sensitive speed control means for controlling movement of said actuator responsive to variations in engine speed, comprising:

gaseous fuel inductor means for introducing a flow of gaseous fuel into said intake manifold;

throttle valve means for determining a maximum flow of gaseous fuel to said fuel inductor means at a given intake suction pressure;

buffer valve means for selectively controlling said flow of gas to said throttle means, said buffer valve means being actuable between a normally closed position and an open position;

a gaseous fuel supply manifold operative for providing said flow of gaseous fuel, said fuel supply manifold including automatic block and vent means for selectively blocking and venting said flow, said block and vent valve means being actuable between a normally closed position and an open position, said fuel supply manifold further including a demand gas regulator, said regulator being connected to said buffer valve means, said regulator being operative for sensing a negative flow pressure through said buffer valve means and allowing said gaseous fuel to be drawn into the engine's charge air at a flow rate proportional to the combustion rate;

means for sensing a physical position of said actuator;

means for opening said block and vent means and said buffer valve means responsive to a predetermined position of said actuator, said block and vent means opening substantially instantly to provide a flow of gaseous fuel to said demand regulator, said buffer valve means cycling open over a predetermined time to gradually allow said flow of gaseous fuel to be drawn into said intake manifold from said regulator; and means for closing said buffer valve means and said block and vent means responsive to a second predetermined position of said actuator, said buffer valve means cycling closed over a predetermined time to gradually reduce said flow of gaseous fuel to said intake manifold, said block and vent means closing a predetermined time after said buffer valve means cycles closed, said load sensitive speed control means being operable for responding to variations in engine speed with a volume of diesel fuel, said supplemental fuel system being operative for replacing a given volume of diesel fuel during a steady state load.

2. In the supplemental gaseous fuel system of claim 1, said fuel supply manifold further comprising means for sensing a pressure of said pressurized flow.

3. In the supplemental gaseous fuel system of claim 1, said engine further comprising an exhaust manifold, said control means further comprising means for sensing a temperature of said exhaust manifold.

4. In the supplemental gaseous fuel system of claim 1, said actuator being electrically actuated, said means for sensing a physical position of said actuator comprising voltage sensing means for sensing a voltage signal applied to said actuator.

5. In the supplemental gaseous fuel system of claim 4, said voltage sensing means comprising a voltage sensing relay.

6. In the supplemental gaseous fuel system of claim 5, said voltage sensing relay including hysteresis means.

7. In the supplemental gaseous fuel system of claim 1, said valve means comprising an electrically actuated ball valve.

8. In the supplemental gaseous fuel system of claim 1, said throttle valve means being adjustable.

9. In the supplemental gaseous fuel system of claim 1, said gas supply manifold further including means for reducing a pressure of said gaseous fuel flow.

10. A supplemental gaseous fuel system for a diesel engine having an intake manifold, a fuel injector pump having an actuator for regulating a volume of diesel fuel supplied to said engine, and load sensitive speed control means for controlling movement of said actuator responsive to variations in engine speed, comprising:

a fuel inductor for introducing a flow of gaseous fuel to said intake manifold;

throttle valve means for determining a maximum flow of gaseous fuel to said fuel inductor;

a buffer valve for selectively controlling said flow to said throttle means, said buffer valve being actuable between a normally closed position and an open position;

a gaseous fuel supply manifold operative for providing said flow of gaseous fuel, said fuel supply manifold including a demand regulator which is connected to said buffer valve, said regulator sensing an airflow through said buffer valve and controlling said flow in response to said airflow;

means for sensing a physical position of said actuator; and control means for opening and closing said buffer valve responsive to predetermined positions of said actuator, said buffer valve cycling open over a predetermined time to gradually allow said flow of gaseous fuel to be drawn into said intake manifold, said buffer valve cycling closed over a predetermined time to gradually reduce said flow of gaseous fuel, said load sensitive speed control means being operable for quickly responding to variations in engine speed with a volume of diesel fuel, said supplemental fuel system being operative for gradually replacing a given volume of diesel fuel during a steady state load.

* * * * *